April 17, 1962  W. A. J. VAN JAARSVELT ETAL  3,030,576
CIRCUIT FOR MEASURING SELF-INDUCTANCES
AND CAPACITANCES AND CHANGES THEREOF
Filed April 14, 1959

INVENTOR.
Willem A. J. Van Jaarsvelt and
Pieter De Waard
BY
Watson, Cole, Grindle & Watson
ATTORNEYS

United States Patent Office 3,030,576
Patented Apr. 17, 1962

3,030,576
CIRCUIT FOR MEASURING SELF-INDUCTANCES AND CAPACITANCES AND CHANGES THEREOF
Willem A. J. Van Jaarsvelt, Delft, and Pieter De Waard, Monster, Netherlands, assignors to Nederlandse Organisatie voor Toegepast-Natuurweten-Schappelijk Onderzoek ten Behoeve van Nijverheid Handel en Verkeer, The Hague, Netherlands
Filed Apr. 14, 1959, Ser. No. 806,345
Claims priority, application Netherlands Apr. 24, 1958
2 Claims. (Cl. 324—57)

The invention relates to measuring circuits, in which use is made of the resonance of an oscillating circuit for purposes of measuring capacitances, self-inductances or changes thereof. When fixing the resonance point by current measuring adjustment should be effected with due observance of a maximum, which, however small the damping of the circuit may be, will always have a certain breadth, which makes for difficult adjustment.

The invention starts from the consideration that, if only the reactive part of the current would be measured, the adjustment could be much more exact, because at resonance this reactive part is zero and the rate at which the current intensity changes at a change in the frequency or at a change in the adjustment of a variable element, exactly at this point is largest.

In order to take advantage of this phenomenon according to this invention, a so-called synchronous or phase detector circuit is used, which, as is known, only gives an output voltage for that component of the input voltage, which is in phase with an auxiliary voltage which is also joined to the synchronous detector.

At resonance, the watt-component, that is the non-reactive part of the current is in phase with the alternating voltage which is supplied to the resonance circuit, the reactive part to be measured then being zero. When there is a deviation of the resonance frequency the reactive part of the current, being the component to be measured, is no longer zero. Hereby the component has been shifted about 90° with regard to the alternating voltage. In order, therefore, to be able to represent this component which is to be measured, an auxiliary voltage must be excited which has been shifted 90° in phase relative to this alternating voltage.

This auxiliary voltage may be derived from said alternating voltage, or the current component which is to be measured may itself be shifted 90° in phase whilst using the alternating voltage which is supplied to the resonance circuit as an auxiliary voltage.

In principle the invention is applicable to any measurements in which the occurrence of resonance serves as a criterion. The invention will now be further illustrated with reference to the accompanying drawings and with the aid of the description of a special application, whereby the capacitance or the self-inductance which is to be measured is connected to the measuring circuit via a cable.

FIGURE 1 is a known circuit occurring in French Patent 1,092,928.

The FIGURES 2, 3, 4 and 5 show how the total current and the reactive part vary, when the frequency of the alternating voltage applied and the capacity of the oscillating circuit, respectively, change while the alternating voltage remains constant.

Figure 1:
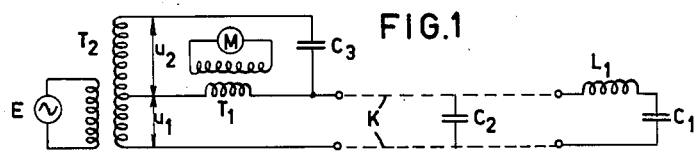

In FIGURE 1 an unknown capacitance $C_1$, being connected in series with a known self-inductance $L_1$, is connected to one end of a cable K, which itself has a capacitance $C_2$ between the two conductors. The other end of this cable is connected, via a current-transformer $T_1$, to a part of the secondary winding of a transformer $T_2$, which part supplies the cable with the series connection with the voltage $U_1$. The second part of the transformer supplies a voltage $U_2$. Said current-transformer $T_1$ is connected to the common point of the two parts of the secondary winding of the transformer $T_2$.

The primary winding of the transformer $T_2$ is connected to an alternating voltage source of low internal resistance, for instance a cathode follower circuit, and with a frequency, which is adjustable, for instance between 0.5 and 2 megacycles.

The part of the secondary winding of the transformer $T_2$ which supplies the voltage $U_2$, is connected via the condenser $C_3$ which imitates the cable, to the end of the current-transformer $T_1$, to which the cable is connected. When now the condition $$C_3 = \frac{U_1}{U_2} \cdot C_2$$

has been fulfilled only the current of the series resonance circuit $L_1C_1$ runs through the primary winding of the transformer $T_1$.

A measuring instrument M, from which the intensity of the current running through the series resonance circuit can be read, is connected to the secondary winding of the transformer $T_1$.

The above-mentioned condition, which $C_3$ must fulfil, is only correct if the cable can be represented with sufficient accuracy by a condenser, and if the leakage fluxes caused by the transformer may be neglected. When the self-inductance $L_1$ is chosen judiciously and the transformer is carried out in an appropriate way there can be no objection against these conditions. If desired, the capacitance $C_3$ may be replaced by a cable with properties analogous to those of the cable represented by $C_2$.

In order to establish a resonance, in this circuit the value of the current must be adjusted to the maximum by trimming the frequency of the voltage source.

This maximum has a certain breadth, so that an accurate adjustment to the resonance cannot be effected. If it is required to measure small changes in capacitance or self-inductance such as occur, for instance, in condenser-microphones and in vibration detectors for investigating mechanical vobriations, the frequency of the voltage source should be chosen in such a way, that the circuit operates on the flank of the resonance curve of $L_1C_1$.

Figure 2:
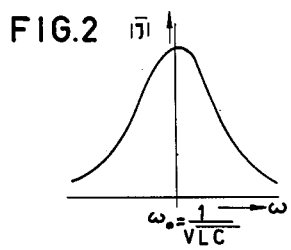
Figure 3:
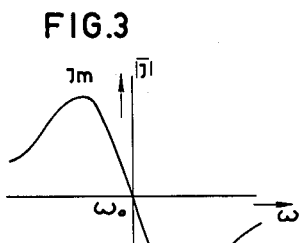
Figure 4:
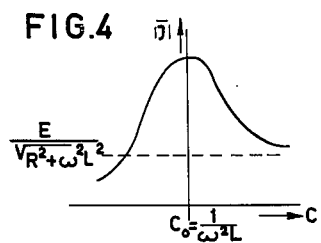
Figure 5:
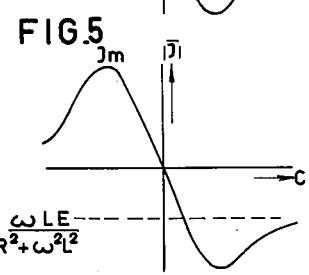

According to this invention these drawbacks are avoided by measuring only the reactive part of the current which runs through the series resonance circuit. In FIGURE 2 the graph of the total current through the resonance circuit is shown as a function of the frequency, whilst in FIGURE 3 the graph of the reactive part of this current is indicated as a function of the frequency. In FIGURE 4 and FIGURE 5 the same figures have been drawn for a constant ω and a variable capacitance C. From FIGURE 3 and FIGURE 5 it is apparent that the reactive part of the current through the series resonance circuit is zero when the circuit is in resonance, whilst the slope of this component of the current as a function of the frequency or of the capacitance is considerable. The statement of resonance as well as the observation of variations in capacitance or in self-inductance is in this way strongly improved by measuring only the reactive part of the resonance current.

Figure 6:
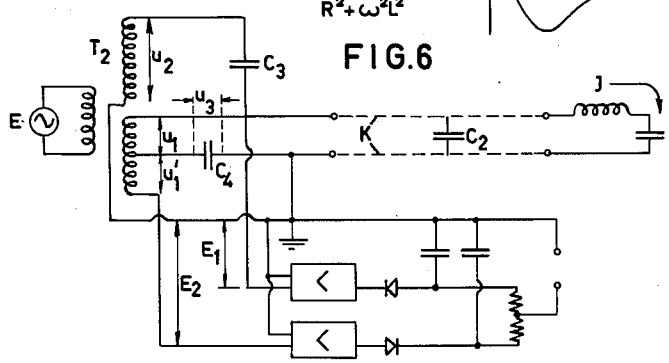
FIGURE 6 shows the measuring circuit obtained by applying the invention to the circuit of FIGURE 1.

In FIGURE 6 the current-transformer $T_1$ of FIGURE 1 has been replaced by a condenser $C_4$, which implies that the impedance should be low in respect of the impedance of the $L_1C_1$ series circuit. The phase of the voltage which now appears on the terminals of this condenser, has been shifted 90° with respect to the phase of the current in the series circuit.

In the voltage on the condenser $C_4$ the current in the $L_1C_1$ series circuit is represented. The impedance of the condenser $C_4$, which is connected in series with the $L_1C_1$ series circuit, can, provided the above-mentioned conditions have been fulfilled, be neglected. The reactive part of the current which runs through the $L_1C_1$ series circuit is represented in the voltage on the condenser $C_4$ by a component which is in phase or in counter-phase with $U_1$. The latter holds good when the impedance of the leakage flux of the transformer $T_2$ is small in relation to the resistance occurring when the $L_1C_1$ series circuit is in resonance.

The secondary winding of the transformer $T_2$ now consists of two equal halves. One of the halves is, via the condenser $C_4$, connected with one end of the cable K, to the other end of which the series resonance circuit is connected, whereby the condenser $C_4$ is at one end connected to the common point of the two halves of the secondary winding, whilst the other end, which is connected to the cable K, is also earthed. Between this earth contact and the two ends of the secondary winding the totals and the differences of the signal voltage $U_3$ and the auxiliary voltages $U_1$ and $U_1'$ respectively, such as are usually present in a synchronous or phase detector circuit can be found. Both the voltages between the ends of the secondary winding and earth can now be amplified and rectified separately, and subsequently subtracted from each other. The voltage thus obtained is proportional to the amplitude of the reactive part of the current which runs through the series resonance circuit.

Figure 7:
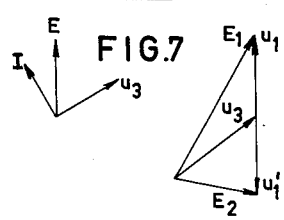
FIGURE 7 shows vector diagrams of voltages existing in the embodiment of FIGURE 6.

In FIGURE 7 the vector diagram of the two voltages between the ends of the secondary winding of the transformer $T_2$ and earth has by way of illustration been drawn. The transformer $T_2$ now also has a tertiary winding $U_2$, purpose of which is to make the known compensation of the current running through the capacitance $C_2$ of the cable K possible. The reference character I in the left-hand diagram of FIG. 7 designates the vector representing the current through the series-resonant L-C circuit, which current is the same as the current through the condenser $C_4$ and which current is represented as a vector leading 90° in phase as compared to the vector representing the signal voltage $U_3$.

We claim:

1. Apparatus for measuring a self-inductance comprising a series resonance circuit including said self-inductance and a standard capacitance, a pair of conductors connected to said resonant circuit, a transformer including a primary winding, a center tapped secondary winding and an auxiliary winding, a source of variable frequency alternating voltage connected to said primary winding, a common connection connected to one of said pair of conductors, a condenser connected between said common connection and said center tap, one end of said auxiliary winding being connected to said common connection, a condenser connecting the other end of said auxiliary winding to one end of said center tapped winding and also to the other one of said pair of conductors, a pair of amplifiers, each end of said center tapped winding being connected to the input of one of said amplifiers, a pair of rectifiers serially connected in polarity opposition between the outputs of said amplifiers and impedance means connected between said rectifiers whereby the output voltages of said rectifiers are subtracted from each other.

2. Apparatus for measuring a capacitance comprising a series resonance circuit including said capacitance and a standard inductance, a pair of conductors connected to said resonance circuit, a transformer including a primary winding, a center tapped secondary winding and an auxiliary winding, a source of variable frequency alternating voltage connecting to said primary winding, a common connection connected to one of said pair of conductors, a condenser connected between said common connection and said center tap, one end of said auxiliary winding being connected to said common connection, a condenser connecting the other end of said auxiliary winding to one end of said center tapped winding and also to the other one of said pair of conductors, a pair of amplifiers, each end of said center tapped winding being connected to the input of one of said amplifiers, a pair of rectifiers serially connected in polarity opposition between the outputs of said amplifiers and impedance means connected between said rectifiers whereby the output voltages of said rectifiers are subtracted from each other.

References Cited in the file of this patent

UNITED STATES PATENTS

| | | |
|---|---|---|
| 1,708,544 | Kummerer | Apr. 9, 1929 |
| 1,856,707 | Horton | May 3, 1932 |
| 2,188,628 | Freystedt | Jan. 30, 1940 |
| 2,524,515 | Chapman | Oct. 3, 1950 |
| 2,671,198 | Beverly | Mar. 2, 1954 |
| 2,682,633 | Woerdemann | June 29, 1954 |
| 2,689,329 | Zimmermann | Sept. 14, 1954 |
| 2,735,064 | Salzberg | Feb. 14, 1956 |
| 2,759,146 | Heinz | Aug. 14, 1956 |
| 2,852,739 | Hansen | Sept. 16, 1958 |
| 2,906,950 | Ichijo | Sept. 29, 1959 |
| 2,939,077 | Brannin | May 31, 1960 |

FOREIGN PATENTS

| | | |
|---|---|---|
| 723,931 | Germany | Aug. 13, 1942 |